United States Patent [19]

Peebles

[11] Patent Number: 4,704,061

[45] Date of Patent: Nov. 3, 1987

[54] CONTAINER AND METHOD FOR LOADING CURRENCY NOTES INTO A CURRENCY CASSETTE

[75] Inventor: John A. Peebles, Dundee, Scotland

[73] Assignee: NCR Corporation, Dayton, Ohio

[21] Appl. No.: 861,215

[22] Filed: May 9, 1986

[30] Foreign Application Priority Data

Nov. 12, 1985 [GB] United Kingdom ................. 8527861

[51] Int. Cl.[4] ............................................. B65G 21/02

[52] U.S. Cl. ..................................... 414/405; 414/403

[58] Field of Search ........................ 414/405, 403, 786; 206/564

[56] References Cited

U.S. PATENT DOCUMENTS

| | | | |
|---|---|---|---|
| 2,555,537 | 6/1951 | Franing | 414/405 X |
| 2,891,687 | 6/1959 | Pick | 414/403 |
| 3,240,610 | 3/1966 | Cease | 414/405 X |
| 3,263,840 | 8/1966 | Peters | 414/405 X |
| 3,456,825 | 7/1969 | Lacoe, Jr. | 414/403 |
| 3,794,327 | 2/1974 | Washington | 414/405 X |
| 3,934,733 | 1/1976 | Worden | 414/405 |
| 3,949,891 | 4/1976 | Butler et al. | 414/405 |
| 4,095,707 | 6/1978 | Kowtkow | 414/405 |
| 4,176,751 | 12/1979 | Gillissie | 414/405 X |

*Primary Examiner*—Peter A. Aschenbrenner
*Attorney, Agent, or Firm*—Wilbert Hawk, Jr.; Albert L. Sessler, Jr.; Elmer Wargo

[57] ABSTRACT

A container for use in loading notes into a currency cassette in a simple and rapid manner includes a base and wall portions upstanding therefrom. A rectangular removable plate is positioned over the base. In order to load the cassette, the container is first loaded with a stack of currency notes with corresponding long edges of the notes resting on the plate and with the end notes in the stack being respectively in engagement with the end wall portions of the container. The cassette is then inverted and placed, with its lid open, over the container. The combination of the container and the cassette is inverted, and the plate is pressed down on the stack of notes through an opening in the base of the container while simultaneously, the remainder of the container is removed from the cassette, thereby leaving the stack of notes in the correct position in the cassette.

10 Claims, 6 Drawing Figures

CONTAINER AND METHOD FOR LOADING CURRENCY NOTES INTO A CURRENCY CASSETTE

BACKGROUND OF THE INVENTION

This invention relates to a container and method used for loading currency notes into currency cassettes of the kind used with cash dispensing machines.

Currency cassettes are used, for example, in automated teller machines (ATMs) of the kind wherein a user inserts a customer-identifying card into the machine and then enters certain data (such as codes, quantity of currency required or to be paid in, type of transaction, etc.) upon one or more keyboards associated with the machine. The machine then processes the transaction, updates the user's account to reflect the current transaction, dispenses cash when requested, and returns the card to the user as part of a routine operation. It is common for an ATM to dispense currency notes of at least two different denominations, in which case, the ATM will normally include a separate currency cassette for notes of each particular denomination.

It is important for the correct operation of the cash dispensing mechanism of an ATM that the currency notes contained in each currency cassette mounted in the ATM be accurately positioned in the cassette with corresponding edges of the notes exactly aligned. Currency notes normally are loaded directly into a currency cassette, and such direct loading can be tedious and time-consuming. It is desirable that the replenishment of an ATM with loaded currency cassettes be carried out as quickly as possible in order to keep to a minimum the time for which the ATM is out of operation. However, it is not always convenient to have available a spare, ready-loaded, currency cassette to use as a replacement for an exhausted cassette, and so, such replenishment may take longer than is desirable.

SUMMARY OF THE INVENTION

An object of this invention is to provide a means and method for rapidly and accurately loading currency notes into a currency cassette.

According to one aspect of this invention, there is provided a container for use in loading a stack of currency notes into a currency cassette. The container includes a tray means for receiving the stack of currency notes. The tray means also includes a base member having an opening therein and also includes a separate planar member positioned over the base member and over the opening to support the stack of currency notes on the planar member in the tray means. The currency cassette has a normal loading position and also has a housing and a receiving means for receiving the tray means. The tray means is shaped to be inserted into the receiving means when the currency cassette is inverted from its normal loading position and lowered relatively over the tray means to form a combination with the tray means, with the stack of currency notes being held within the combination. When the combination is inverted to present the currency cassette in the normal loading position, the planar member is accessible through the opening in the base member to enable an operator to hold the planar member and the stack of currency notes in the currency cassette while the tray means without the planar member and the stack of currency notes is removed from the currency cassette.

According to another aspect of the invention, there is provided a method of loading a stack of currency notes into an opened currency cassette which includes the steps of:

(a) loading a stack of currency notes into a tray means for holding the stack of currency notes;

(b) inverting the opened currency cassette from its normal loading position and positioning the opened currency cassette over the tray means with the stack of currency notes therein;

(c) moving the opened currency cassette and the tray means relatively towards each other to form a conbination with the stack of currency notes being held in the combination;

(d) inverting the combination so as to present the currency cassette in its normal loading position; and (e) withdrawing the tray means from the combination of step(d) so as to leave the stack of currency notes in the opened currency cassette.

The container and method of this invention enable the edges of the currency notes to be exactly aligned when loaded into the opened currency cassette and also enable the loading to be effected in a short time to thereby minimize the time when the associated ATM is out of operation.

These advantages and others will be more readily understood in connection with the following description, claims and drawing.

DETAILED DESCRIPTION OF THE INVENTION

Figure 1:
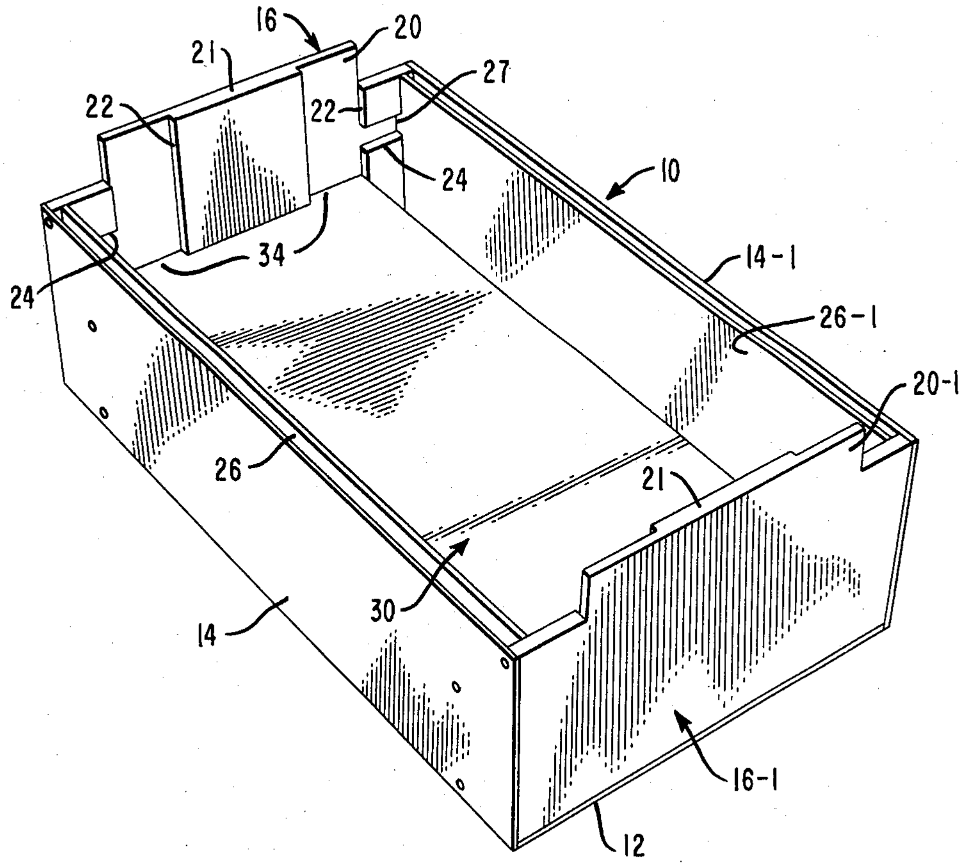
FIG. 1 is a perspective view of a container made in accordance with this invention for loading currency notes into a currency cassette.
Figure 3:
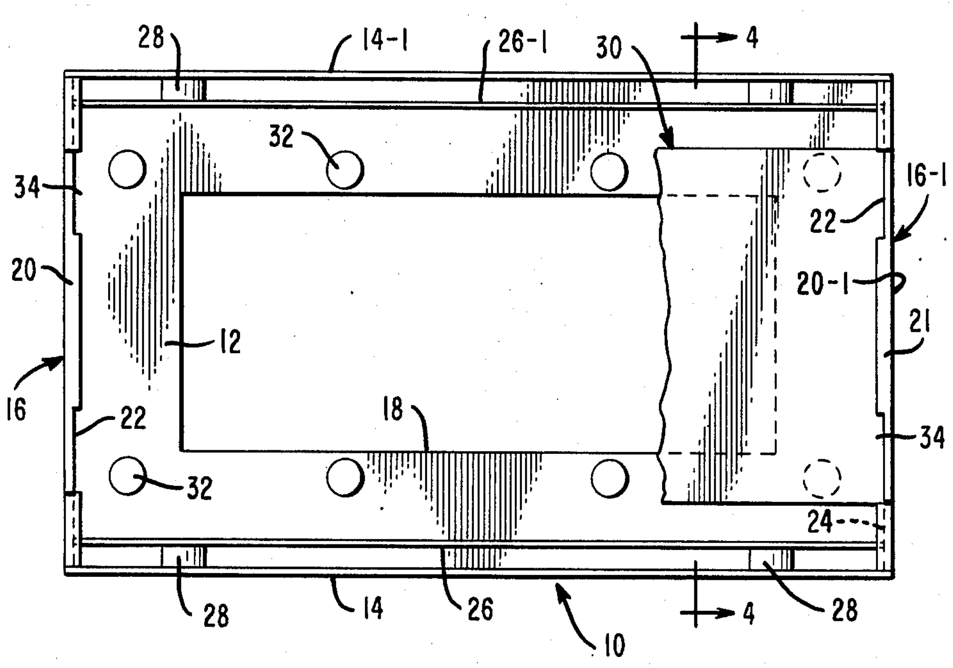
FIG. 3 is a plan view of the container shown in FIG. 1, with a removable plate forming part thereof shown partly broken away.

FIG. 1 shows a tray means or container 10 for holding currency notes which is made according to this invention. The container 10 shown therein is in the form of an open-topped box having a rectangular base 12 and rectangular wall portions 14, 14-1, 16, and 16-1 upstanding from the base 12. The side wall portions 14 and 14-1 may be secured to, or be integral with, the long, opposed edges of the base 12. Correspondingly, the end walls portions 16 and 16-1 may be secured to or be integral with the short opposed edges of the base 12. The base 12 has a rectangular opening 18 (FIG. 3) centrally formed therein for a purpose which will be explained later herein.

The end wall portions 16 and 16-1 are provided with centrally-positioned, upstanding projecting portions 20 and 20-1, respectively, which project above, and are spaced from, the side wall portions 14 and 14-1. The top edges 21 of the projecting portions 20 and 20-1 are horizontal and lie in the same plane as each other. The inwardly facing surfaces of each of the end wall portions 16 and 16-1 are provided with two vertically extending recesses 22. Also, the inwardly facing surfaces of each end wall portion 16 and 16-1 are provided with two horizontally extending recesses 24. Each recess 24 extends inwardly from the associated side wall portions 14 or 14-1 to the outer edge of the adjacent vertically-extending recess 22.

Figure 4:
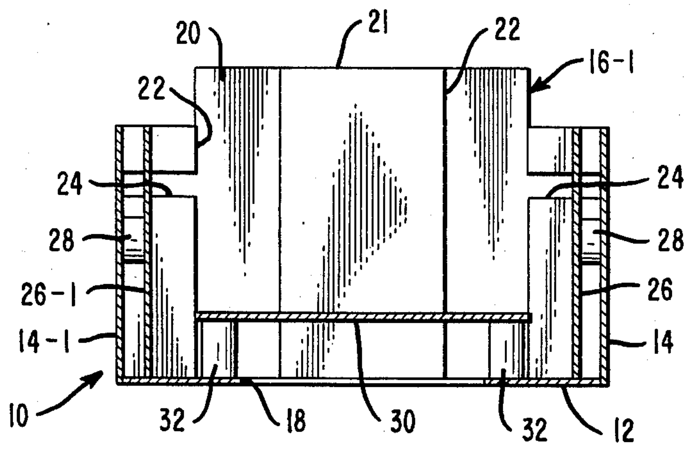
FIG. 4 is a cross-sectional, elevational view of the container taken along the line IV—IV of FIG. 3.

The container 10 (FIG. 1) includes two side plates 26 and 26-1 which extend between the end wall portions 16 and 16-1 and which are respectively positioned a short distance inwardly of, and parallel to, the side wall portions 14 and 14-1. The top edges of the plates 26 and 26-1 are aligned with the top edges of the side wall portions 14 and 14-1, and the short edges of each plate 26 and 26-1 are provided with projections 27 (FIG. 1) which respectively engage the recesses 24 extending inwardly from the associated side wall portion, like 14-1. The side plates 26 and 26-1 are attached to, and adjustably spaced from, the associated side wall portions 14 and 14-1 by means of two spacer members 28 (FIG. 4). The spacer members 28 are replaceable by spacer members of different sizes, when necessary, to thereby adjust the spacing between the side plates 26 and 26-1. Also, the container 10 includes a removable flat, generally-rectangular planar member or base plate 30 positioned above the base 12, the plate 30 being spaced from the base 12 by a plurality of spacer members 32 (FIGS. 3 and 4) secured to the base 12. The spacer members 32 are replaceable by spacer members of different sizes, whereby the distance between the plate 30 and the top edges 21 of the projecting portions 20 and 20-1 may be adjusted. The short edges of the plate 30 are respectively in cooperative engagement with the end wall portions 16 and 16-1. Each short edge of the plate 30 is provided with two projections 34 which respectively, slidably engage the recesses 22 formed in the associated end wall portions 16 and 16-1, the arrangement is such that the plate 30 can be removed from the remainder of the container 10 by moving the plate 30 relatively away from the base 12, with the projections 34 sliding along the recesses 22.

The container 10 (FIG. 2) is adapted to hold a stack of currency notes 36, with the corresponding long edges of the notes 36 resting on the plate 30 and with the end notes in the stack being in engagement with the end wall portions 16 and 16-1. By choosing the spacer members 28 and 32 (FIG. 4) to be of appropriate sizes, the side plates 26 and 26-1 and the base plate 30 are positioned so that the ends of each note 36 respectively abut against the side plates 26 and 26-1 and the upper long edges of the notes 36 lie in substantially the same plane as the top edges 21 of the projecting portions 20 and 20-1. It should be appreciated that, by virtue of the projections 34 (FIG. 1) of the base plate 30 engaging the vertically extending recesses 22, the end notes 36' in the stack are prevented from slipping down between the ends of the plate 30 and the end wall portions 16 and 16-1. Also, by virtue of the projections 27 (FIG. 1) of the side plates 26 engaging the horizontally extending recesses 24, there is no risk of either of the end notes 36' (FIG. 2) in the stack being displaced laterally between the adjacent end wall portion 16, for example, and an end of one of the side plates, like 26-1.

Figure 5:
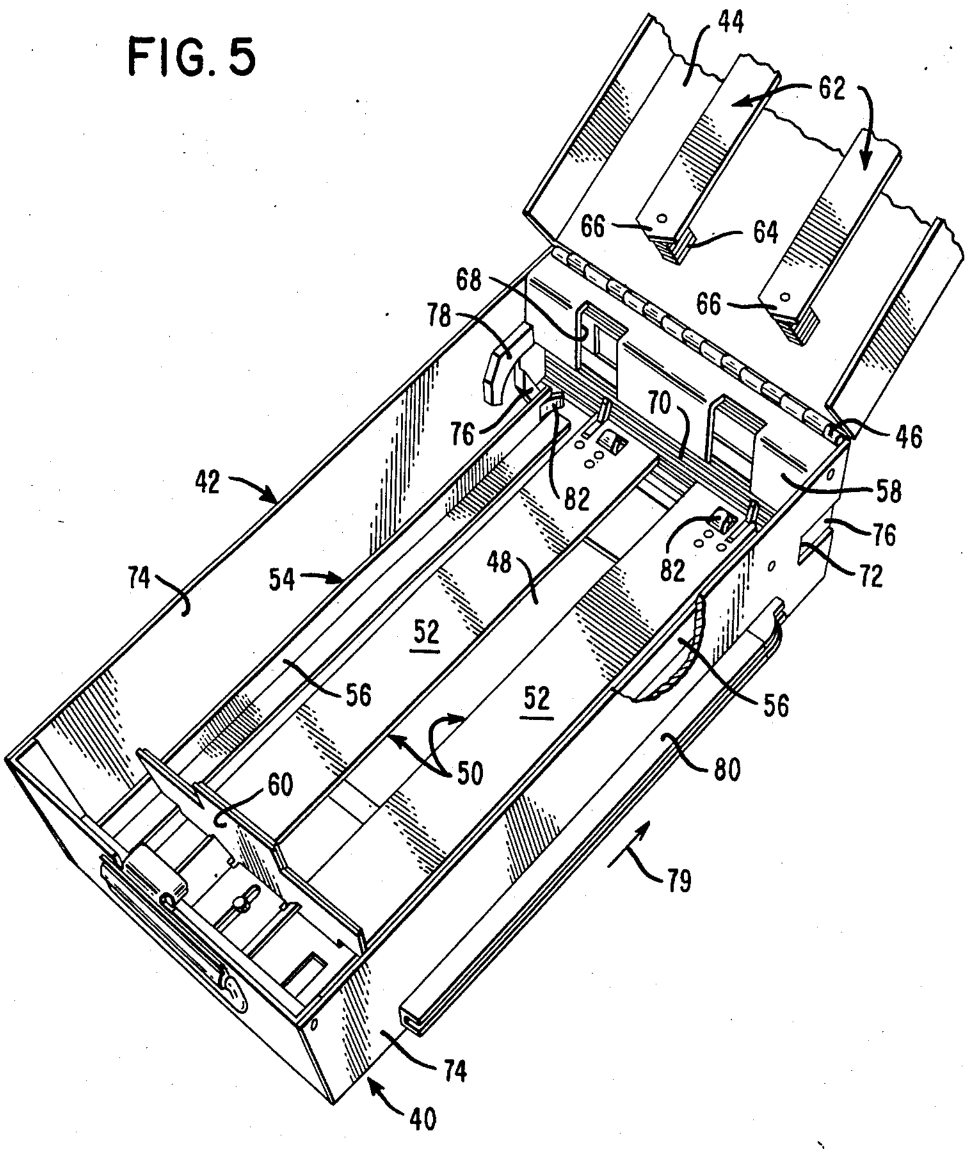
FIG. 5 is a perspective view of an associated currency cassette taken from a rearward position, the cassette being shown empty and with its lid in an open position.
Figure 6:
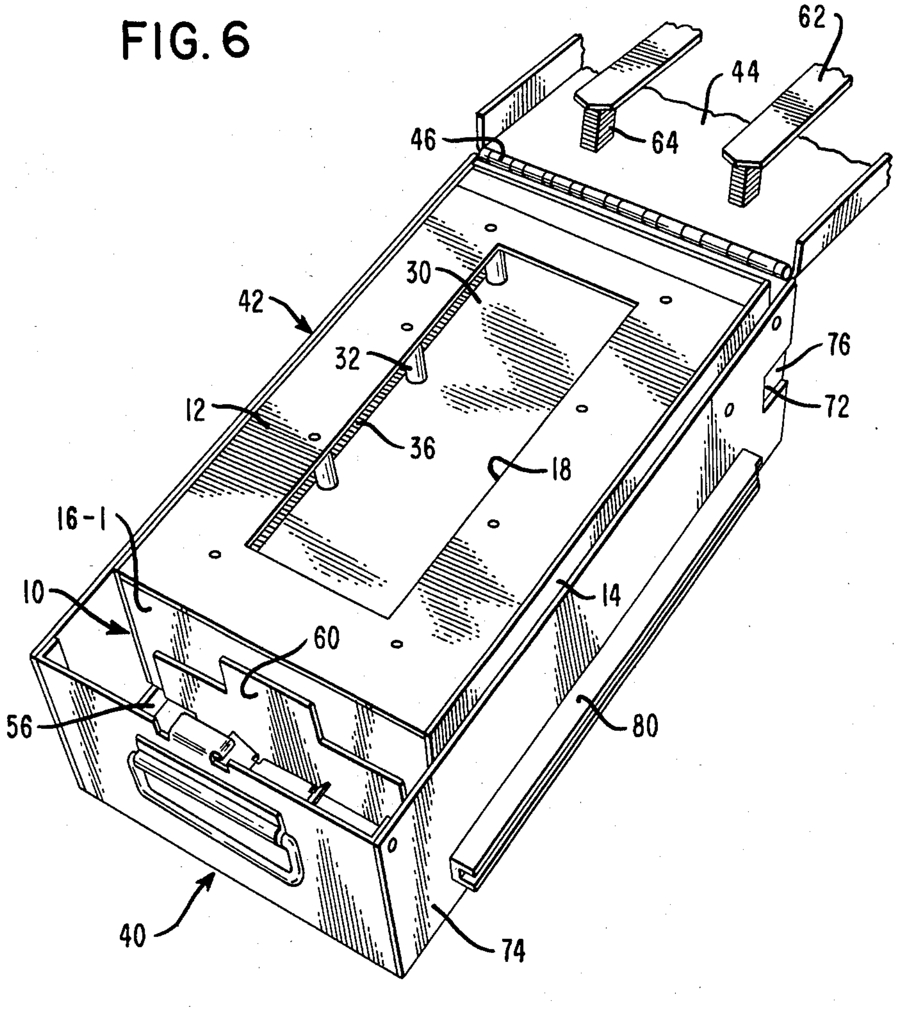
FIG. 6 is a perspective view of the combination of the container and the currency cassette, showing the container in an inverted, loading position in the cassette.

Referring now particularly to FIGS. 5 and 6, the container 10 made in accordance with the present embodiment is designed for use in loading currency notes into a currency cassette 40. The cassette 40 is of the kind used, for example, in NCR 5070, 5081 and 5084 ATMs manufactured by NCR (Manufacturing) Limited of Dundee, Scotland. The cassette 40 comprises a rectangular receptacle 42 or receiving means for currency notes, and the cassette 40 is provided with a lid 44. The lid 44 is connected at one end by means of a hinge 46 to one end of the receptacle 42, the lid 44 being pivotable between an open position as shown in FIGS. 5 and 6 and a closed position in which it closes the top of the receptacle 42. Locking means (not shown) are provided for locking the lid 44 in its closed position.

Mounted within the receptacle 42 adjacent to the base 48 thereof are two note support members 50 (FIG. 5) which extend along the receptacle 42 and which are each provided with a support surface 52. Two lower, note guide members 54 are adjustably attached, respectively, to the support members 50 whereby the spacing apart of two vertical guide portions 56 respectively forming part of the guide members 54 may be adjusted to correspond to the lengths of the currency notes which the cassette 40 is intended to hold. In a similar manner to the container 10, the receptacle 42 of the cassette 40 is adapted to hold a stack of currency notes 36 with the corresponding long edges of the stack resting on the support surfaces 52 and extending between the vertical guide portions 56. The stack of notes 36, when loaded in the receptacle 42, extends between an upper note retaining member 58 positioned at the front end of the receptacle 42 (which is the end to which the lid 44 is hinged) and a spring-loaded pusher plate 60, the pusher plate 60 being arranged to urge the stack of notes 36 towards the retaining member 58 with an upper portion of the first note in stack being pressed against the member 58. The pusher plate 60 can be latched in a fully retracted position away from the member 58, as shown in FIG. 5, by latching means (not shown). Two upper note guide members 62 (FIGS. 5, 6) are attached to, and are adjustably spaced from, the inner surface of the lid 44 by means of replaceable spacer members 64. The size of the spacer members 64 is so chosen that, with a stack of currency notes held in the receptacle 42 as described above and with the lid 44 in its closed position, the guide members 62 lightly engage with the upper edges of the notes in the stack.

With the lid 44 closed, end portions 66 (FIG. 5) of the guide members 62 are respectively accommodated in recesses 68 formed in the retaining member 58. The cassette 40 is adapted to have currency notes extracted therefrom through an opening in the front end of the receptacle 42, this opening being normally closed by a slatted shutter 70. Also, recesses 72 formed in the front edges of the side walls 74 of the receptacle 42 (one of the walls 74 being shown partly broken away in FIG. 5) are normally closed by respective shutters 76 pivotally mounted on the inner surfaces of the side walls 74. Each shutter 76 is cooperatively associated with a respective side guide member 78 mounted on the inner surface of the respective side wall 74. The shape of the container 10 is such that the container 10 will fit into the interior of the receptacle 42 with the edges 21 of the projecting portions 20 and 20-1 engaging the support surfaces 52, with the side wall portions 14 and 14-1 forming a sliding fit between the side guide members 78, and with the end wall portions 16 and 16-1, respectively, forming a sliding fit between the retaining member 58 and the pusher plate 60 in its fully-retracted position.

The cassette 40, when loaded with currency notes and having its lid 44 locked in a closed position, is adapted to be inserted into a cassette receiving compartment of a cash dispenser unit of an ATM (not shown), the direction of insertion corresponding to the direction indicated by the arrow 79 in FIG. 5. The cassette 40 is provided on its side walls 74 with horizontally extending guide members 80 which are arranged to engage cooperating guide means provided in the cassette receiving compartment. During the insertion of the cassette 40 into the cassette receiving compartment, the slatted shutter 70 is moved to a retracted position along the base 48 of the receptacle 42, and the side shutters 76 are pivoted away from the recesses 72. As is well known in the operation of an ATM, currency notes are extracted one by one from the cassette 40 by pick members (not shown) rockably mounted on a shaft, this shaft (not shown) passing through the recesses 72 when the cassette 40 is fully inserted in the cassette receiving compartment of the ATM. Prior to the first note in the stack of currency notes in the cassette 40 being extracted by the pick members, the lower edge of this note is retained in position by leaf springs 82 (FIG. 5) attached to the support members 50 and to the guide members 54.

Figure 2:
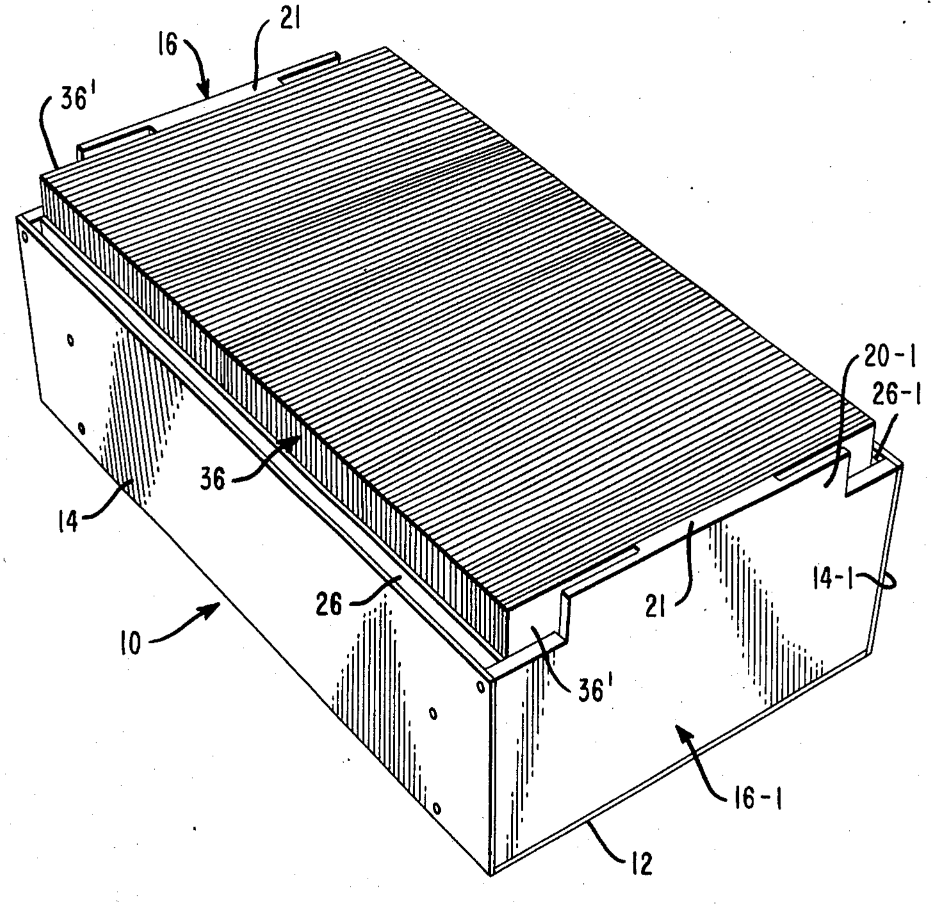
FIG. 2 is a view similar to FIG. 1 but showing the container loaded with a stack of currency notes.

The manner in which the container 10 (FIG. 3) is used to load a stack of currency notes 36 into the cassette 40 will now be described. Firstly, a check is made as to whether the spacing between the side plates 26 and 26-1 corresponds to the length of the notes 36 to be loaded and as to whether the spacing of the removable plate 30 from the top edges 21 of the projecting portions 20 and 20-1 corresponds to the width of the notes 36 to be loaded. If either of these spacings is incorrect, then the relevant spacer members 28 or 32 are replaced by spacer members of the appropriate size. With the positions of the side plates 26 and 26-1 and the removable plate 30 correctly adjusted, currency notes 36 are loaded into the container 10 with corresponding long edges of the notes 36 resting on the plate 30. The loading continues until the container 10 is filled by a stack of notes 36 as shown in FIG. 2, the end notes 36' in the stack engaging the end wall portions 16 and 16-1, and the ends of each individual note 36 respectively abutting against the side plates 26 and 26-1. It should be noted that the long edges of the notes 36 resting on the plate 30 are the edges which will be the top edges of the notes 36 when the notes 36 are loaded in the correct position in the receptacle 42 of the cassette 40.

When a cassette 40 is to be loaded, the associated lid 44 is opened and set to its fully-open position as shown in FIG. 6, and the pusher plate 60 is latched in its fully-retracted position. The cassette 40 is then inverted and placed over the loaded container 10 (FIG. 2) with the edges 21 of the projecting portions 20 and 20-1 being in contact with the support surfaces 52 and with the wall portions 14, 14-1, 16, and 16-1 of the container fitting between the guide members 78 (FIG. 5) and between the retaining member 58 and the pusher plate 60, as previously explained. It should be understood that the edges 21 of the projecting portions 20 and 20-1 are positioned between the guide members 54, with the top edges of the notes 36 fitting between the vertical guide portions 56 of the guide members 54 and with the top edges of the side wall portions 14 and 14-1 of the side plates 26 being positioned below the guide members 54.

Next, the combination of the container 10 and the cassette 40, with the stack of notes 36 held within the combination, is inverted to the position shown in FIG. 6, the base 12 of the container 10 projecting slightly above the receptacle 42 which is now in its normal loading or operating position. The person loading the cassette 40 then presses down on the removable plate 30 through the opening 18 with one hand and at the same time lifts the remainder of the container 10 away from the cassette 40 with his other hand. At the completion of this last-mentioned operation, the stack of notes 36 is located in the correct position in the receptacle 42, and the plate 30 rests on top of the stack. The plate 30 is then removed from the top of the stack of notes 36, and the pusher plate 60 is unlatched so that the pusher plate 60 urges the stack towards the retaining member 58. Finally, the lid 44 is closed and locked, and the loaded cassette 40 is now ready for insertion in the cassette receiving compartment of an ATM as previously described.

It should be understood that the container 10 described above makes possible the accurate loading of the cassette 40 in a simple and extremely rapid manner. Also, it should be understood that a stock of ready-loaded containers 10 in accordance with the invention can be held available at a bank or other building where an ATM is installed so that the time taken to replenish currency cassettes used in the ATM can be kept to a minimum.

What is claimed is:

1. A container for use in loading a stack of currency notes into an opened currency cassette, said container comprising:

tray means for receiving said stack of currency notes;

said tray means having a base member having an opening therein and also having a separate planar member positioned over said base member and over said opening to support said stack of currency notes on said planar member in said tray means;

said currency cassette having a normal loading position and comprising a housing and receiving means for receiving said tray means;

said tray means being shaped to be inserted in said receiving means when said currency cassette is inverted from its said normal loading position and lowered relatively over said tray means to form a combination with said tray means with said stack of currency notes being held within said combination;

said combination when inverted to present said currency cassette in said normal loading position enabling said planar member to be accessible through said opening in said base member to enable an operator to hold said planar member and said stack of currency notes in said currency cassette while said tray means without said planar member and said stack of currency notes is removed from said currency cassette.

2. The container as claimed in claim 1 in which said tray means is generally rectangular in shape and has first and second opposed end walls and first and second opposed side walls having a predetermined height, said first and second opposed end walls each having an end portion whose height is greater than the height of said opposed side walls;

said tray means also including means for adjustably positioning said planar member relative to the height of said end portions of said first and second opposed end walls.

3. The container as claimed in claim 1 in which said tray means is generally rectangular in shape and has first and second opposed end walls, with each of said first and second opposed end walls having first and second recesses, respectively, therein;

said separate planar member being generally rectangular in shape and having first and second opposed edges; and each of said first and second opposed edges having first and second projections, respectively, extending therefrom to fit into said first and second recesses, respectively, when said planar member is positioned over said base member.

4. The container as claimed in claim 3 in which said tray means has first and second opposed side walls joined to said first and second opposed end walls to form a wall being generally rectangular in shape;

said tray means including first and second opposed side plates and also including means to adjustably position said first and second opposed side plates parallel to said first and second opposed side walls, respectively, to accommodate varying widths of stacks of currency.

5. The container as claimed in claim 4 in which said first and second opposed end walls each have third and fourth recesses therein, respectively;

each of said first and second opposed side plates having third and fourth projections thereon, with said third projections of said first and second opposed side plates fitting into said third recesses and with said fourth projections of said first and second opposed side plates fitting into said fourth recesses.

6. The container as claimed in claim 5 in which each said first and second opposed end wall has an end portion whose height is greater than the height of said first and second opposed side walls.

7. The container as claimed in claim 6 in which said tray means also includes means for adjustably positioning said planar member relative to the height of said end portions of said first and second opposed end walls.

8. A method of loading a stack of currency notes into an opened currency cassette comprising the steps of:

(a) loading a stack of currency notes into a tray means for holding the stack of currency notes;

(b) inverting the opened currency cassette from its normal loading position and positioning the opened currency cassette over said tray means with said stack of currency notes therein;

(c) moving said opened currency cassette and said tray means relatively towards each other to form a combination with said stack of currency notes being held in said combination;

(d) inverting said combination so as to present said currency cassette in its normal loading position; and (e) withdrawing said tray means from said combination of step d so as to leave said stack of currency notes in said opened currency cassette.

9. The method as claimed in claim 8 in which said tray means has a base member with an opening therein and also has a separate planar member positioned over said base member to receive said stack of currency notes, and in which said withdrawing step comprises the step of:

(e) engaging said separate planar member through said opening in said base member to hold said stack of currency notes in said opened currency cassette while withdrawing said tray means from said opened currency cassette.

10. A method of loading a stack of currency notes into an opened currency cassette comprising the steps of:

(a) loading a stack of currency notes into a tray means for holding the stack of currency notes;

(b) storing said tray means with said stack of currency notes therein until an opened currency cassette is presented for loading;

(c) inverting the opened currency cassette from its normal loading position and positioning the opened currency cassette over said tray means with said stack of currency notes therein;

(d) moving said opened currency cassette and said tray means relatively towards each other to form a combination with said stack of currency notes being held in said combination;

(e) inverting said combination so as to present said currency cassette in its normal loading position; and (f) withdrawing said tray means from said combination of step (d) so as to leave said stack of currency notes in said opened currency cassette.

* * * * *